United States Patent
Nomura et al.

(10) Patent No.: US 9,684,373 B2
(45) Date of Patent: Jun. 20, 2017

(54) APPARATUS AND METHOD FOR AUTOMATIC CALIBRATION OF GAZE DETECTION

(71) Applicant: SONY CORPORATION, Tokyo (JP)

(72) Inventors: Eisuke Nomura, Tokyo (JP); Makoto Sato, Tokyo (JP); Kazuyuki Yamamoto, Kanagawa (JP); Takuro Noda, Tokyo (JP); Sayaka Watanabe, Tokyo (JP); Seiji Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 117 days.

(21) Appl. No.: 14/608,509

(22) Filed: Jan. 29, 2015

(65) Prior Publication Data
US 2015/0227197 A1    Aug. 13, 2015

(30) Foreign Application Priority Data

Feb. 10, 2014 (JP) ................................ 2014-023301

(51) Int. Cl.
*G06F 3/00* (2006.01)
*G06F 3/01* (2006.01)
*G06F 3/0484* (2013.01)

(52) U.S. Cl.
CPC .............. *G06F 3/013* (2013.01); *G06F 3/005* (2013.01); *G06F 3/04842* (2013.01)

(58) Field of Classification Search
CPC ........ G06F 3/005; G06F 3/013; G06F 3/0418; G06F 3/04842
See application file for complete search history.

(56) References Cited

U.S. PATENT DOCUMENTS

2013/0329957 A1* 12/2013 Ebisawa ................ A61B 3/113
                                                      382/103
2014/0055591 A1*  2/2014 Katz ...................... G06F 3/013
                                                        348/78

FOREIGN PATENT DOCUMENTS

JP      2012-065781 A     4/2012
WO   WO 2013059940 A1 *  5/2013 ............ A61B 3/113

OTHER PUBLICATIONS

A. Villanueva and R. Cabeza, "A Novel Gaze Estimation System With One Calibration Point," in IEEE Transactions on Systems, Man, and Cybernetics, Part B (Cybernetics), vol. 38, No. 4, pp. 1123-1138, Aug. 2008.*
W. Shih and J. Liu, "A calibration-free gaze tracking technique", Proc. 15th Conf. Patterns Recognition, vol. 4, pp. 201-204, 2000.*

* cited by examiner

*Primary Examiner* — Larry Sternbane
(74) *Attorney, Agent, or Firm* — Chip Law Group

(57) ABSTRACT

There is provided an information processing apparatus including an operation detecting unit configured to detect an operation of an operator to an object that is displayed in a display screen image for performing a predetermined input, a sight line detecting unit configured to detect a movement of a sight line of the operator on the display screen image, and a correction coefficient acquiring unit configured to acquire a correction coefficient for correcting an error of a case where the operator performs sight line input, on the basis of the movement of the sight line detected during the operation of the operator to the object.

11 Claims, 12 Drawing Sheets

APPARATUS AND METHOD FOR AUTOMATIC CALIBRATION OF GAZE DETECTION

CROSS REFERENCE TO RELATED APPLICATIONS

This application claims the benefit of Japanese Priority Patent Application JP 2014-0233301 filed Feb. 10, 2014, the entire contents of which are incorporated herein by reference.

BACKGROUND

The present disclosure relates to an information processing apparatus, an information processing method, and a program.

A technology for detecting a sight line of a person, for example, projects an infrared light or the like on an eyeball of a user, and detects the sight line from the pupil center and the corneal curvature center obtained from the position of the reflected image on the corneal surface. This technology is utilized to determine the position that the user gazes at on a display.

In the meantime, an error sometimes occurs between the position on the display which is determined by the sight line detected by utilizing the reflected image in the corneal surface, and the position that the user actually gazes at. In order to correct this error, the sight line calibration is executed to calculate a correction coefficient for compensating the error (refer to JP 2012-65781A).

SUMMARY

However, the sight line calibration, for example, sequentially displays a plurality of gazing points on the display, to prompt the user to gaze at the gazing point. Therefore, the burden on the user is likely to increase.

Therefore, the present disclosure proposes a method to execute the sight line calibration without overburdening the user.

According to an embodiment of the present disclosure, there is provided an information processing apparatus including an operation detecting unit configured to detect an operation of an operator to an object that is displayed in a display screen image for performing a predetermined input, a sight line detecting unit configured to detect a movement of a sight line of the operator on the display screen image, and a correction coefficient acquiring unit configured to acquire a correction coefficient for correcting an error of a case where the operator performs sight line input, on the basis of the movement of the sight line detected during the operation of the operator to the object.

According to another embodiment of the present disclosure, there is provided an information processing method including detecting an operation of an operator to an object that is displayed in a display screen image for performing a predetermined input, detecting a movement of a sight line of the operator on the display screen image, and acquiring a correction coefficient for correcting an error of a case where the operator performs sight line input, on the basis of the movement of the sight line detected during the operation of the operator to the object.

According to another embodiment of the present disclosure, there is provided a program for causing a computer to execute detecting an operation of an operator to an object that is displayed in a display screen image for performing a predetermined input, detecting a movement of a sight line of the operator on the display screen image, and acquiring a correction coefficient for correcting an error of a case where the operator performs sight line input, on the basis of the movement of the sight line detected during the operation of the operator to the object.

As described above, according to the present disclosure, the sight line calibration is executed without overburdening the user.

DETAILED DESCRIPTION OF THE EMBODIMENT(S)

Figure 1:
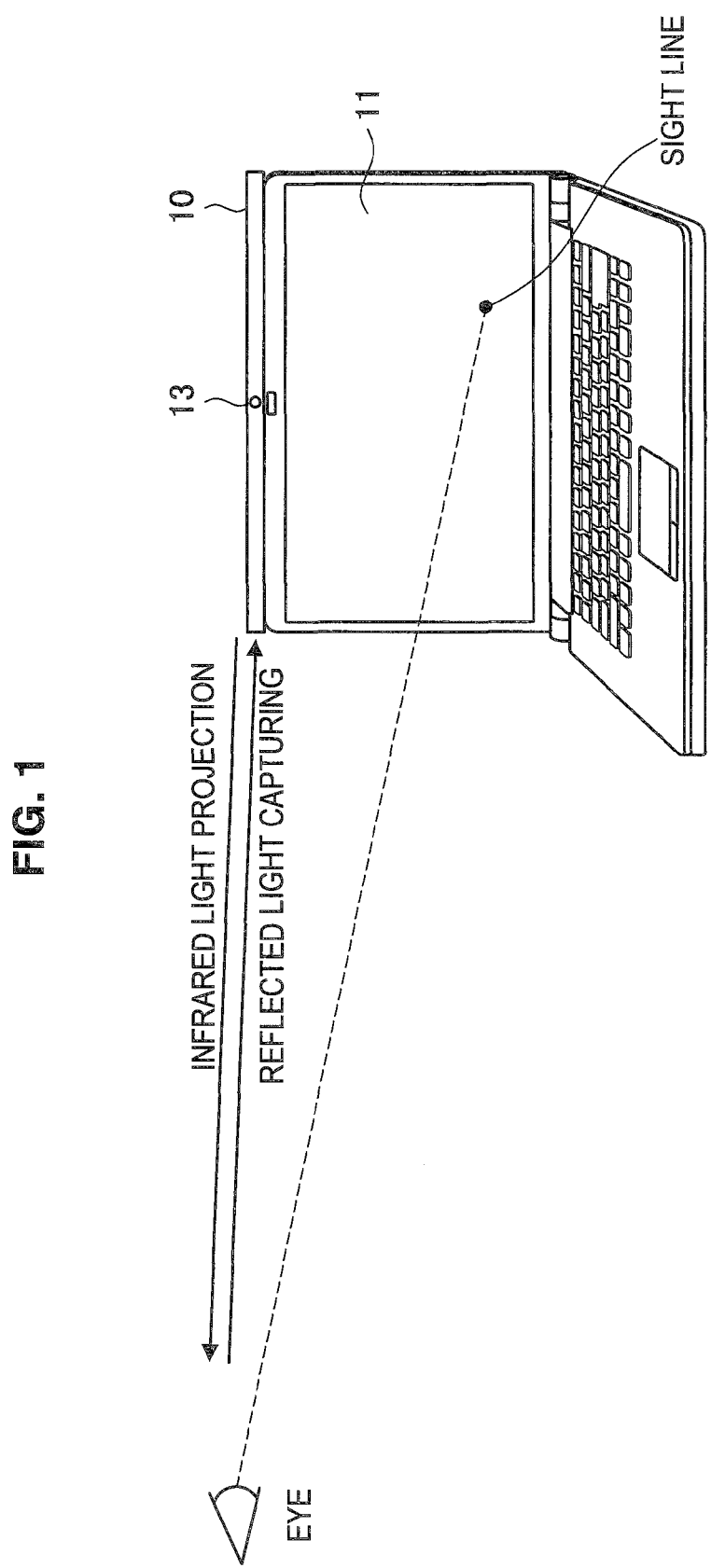
FIG. 1 is a schematic diagram for describing an example of sight line detection.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be made in the following order:
1. Sight Line Detection and Calibration
1.1. Overview of Sight Line Detection
1.2 Calibration according to Comparative Example 2. First Embodiment
2-1. Configuration of Information Processing Apparatus
2-2. Operation of Information Processing Apparatus
3. Second Embodiment
4. Hardware Configuration
5. Conclusion
    <1. Sight Line Detection and Calibration>
    (1.1. Overview of Sight Line Detection)

Various methods are proposed as the method to detect the sight line of a user.

FIG. 1 is a schematic diagram for describing an example of the sight line detection. Here, as illustrated in FIG. 1, the eye of the user looks at a display screen of a display unit 11 of an information device 10. First, the information device 10 projects an infrared light on the eye of the user. Thereafter, the information device 10 captures a reflected light of the infrared light with an imaging unit 13 such as a camera. Thereby, the position that the user looks at, which is the sight line, is detected and tracked. Here, the sight line means the point on the display unit 11 that the eye of the user looks at.

Figure 2:
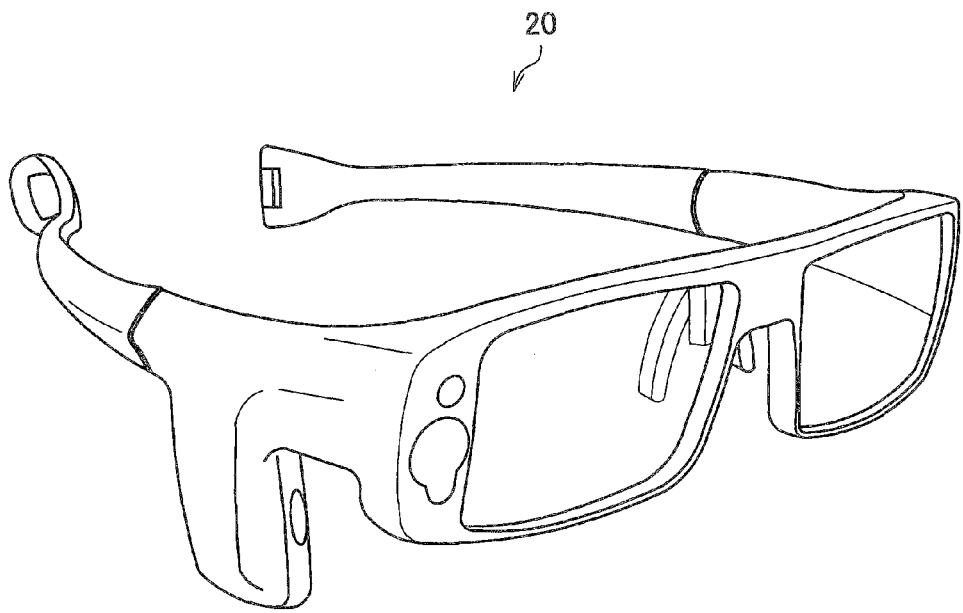
FIG. 2 is a diagram illustrating a device used in sight line detection by an infrared light.

Although in FIG. 1 the infrared light is directly projected on the eye of the user, the user may wear a device 20 of a glasses type illustrated in FIG. 2, for example. FIG. 2 is a diagram illustrating an example of the device 20 used in the sight line detection by the infrared light.

Although in the above an example in which the sight line is detected using the infrared light is described, the present disclosure is not limited thereto. For example, there is a method to detect and track the sight line, using only the shot image captured by the imaging unit, without projecting the infrared light.

Also, as the estimation method of the sight line, there is a method to estimate the sight line using a three-dimensional model of an eyeball, for example. This estimation method of the sight line is performed as in the following.

First, the position and the direction (the optical axis, the eye axis) of the eyeball relative to the display screen is detected, using the eyeball image or the like captured by the imaging unit. Next, the difference (the error) in relation to the sight line (the visual axis) of the user is corrected (i.e., the correction of the error between the optical axis and the visual axis), and estimated from the detected position and direction of the eyeball. Next, the point that the user looks at in the display screen is estimated from the intersection point of the visual axis and the display screen.

(1.2. Calibration according to Comparative Example)

In the meantime, in order to accurately track the sight line, it is important to adequately correct the error between the optical axis and the visual axis. That is, what is called the calibration is executed to correct the difference between the eyes of individuals (the size, the curvature radius, etc. of the eyeball), and the difference between the imaging devices (specifically, the position relationship between the imaging device and the display screen image, etc).

Here, the calibration corrects the error by instructing the user to look at a specific site and recording the state of the eye at that time. This calibration adjusts the error between the intersection point of the position and the direction (the visual axis) of the sight line on the display screen image and the point that the user looks at on the display screen image. The error arises from the difference of the eye of the individual the difference of the imaging device.

Figure 3:
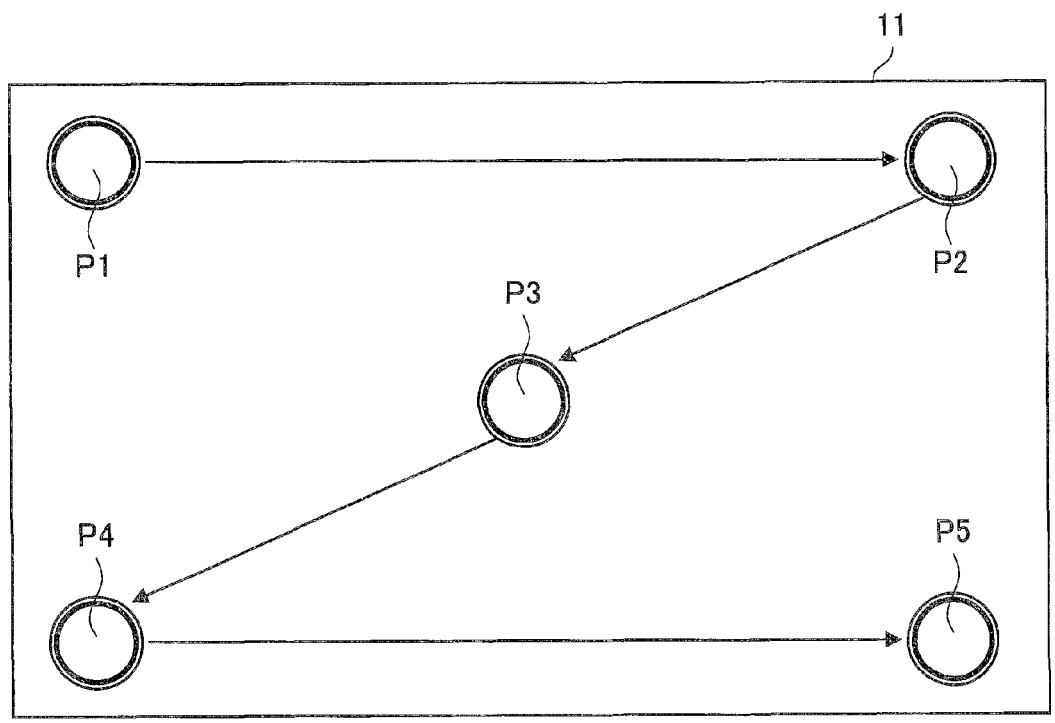
FIG. 3 is a schematic diagram for describing calibration according to a comparative example.

FIG. 3 is a schematic diagram for describing the calibration according to a comparative example. In the comparative example illustrated in FIG. 3, five gazing points are sequentially displayed one after another on the display screen of the display unit 11, to prompt the user to gaze at the gazing points P1 to P5. During this, the user gazes for about one second at each gazing point.

Figure 4:
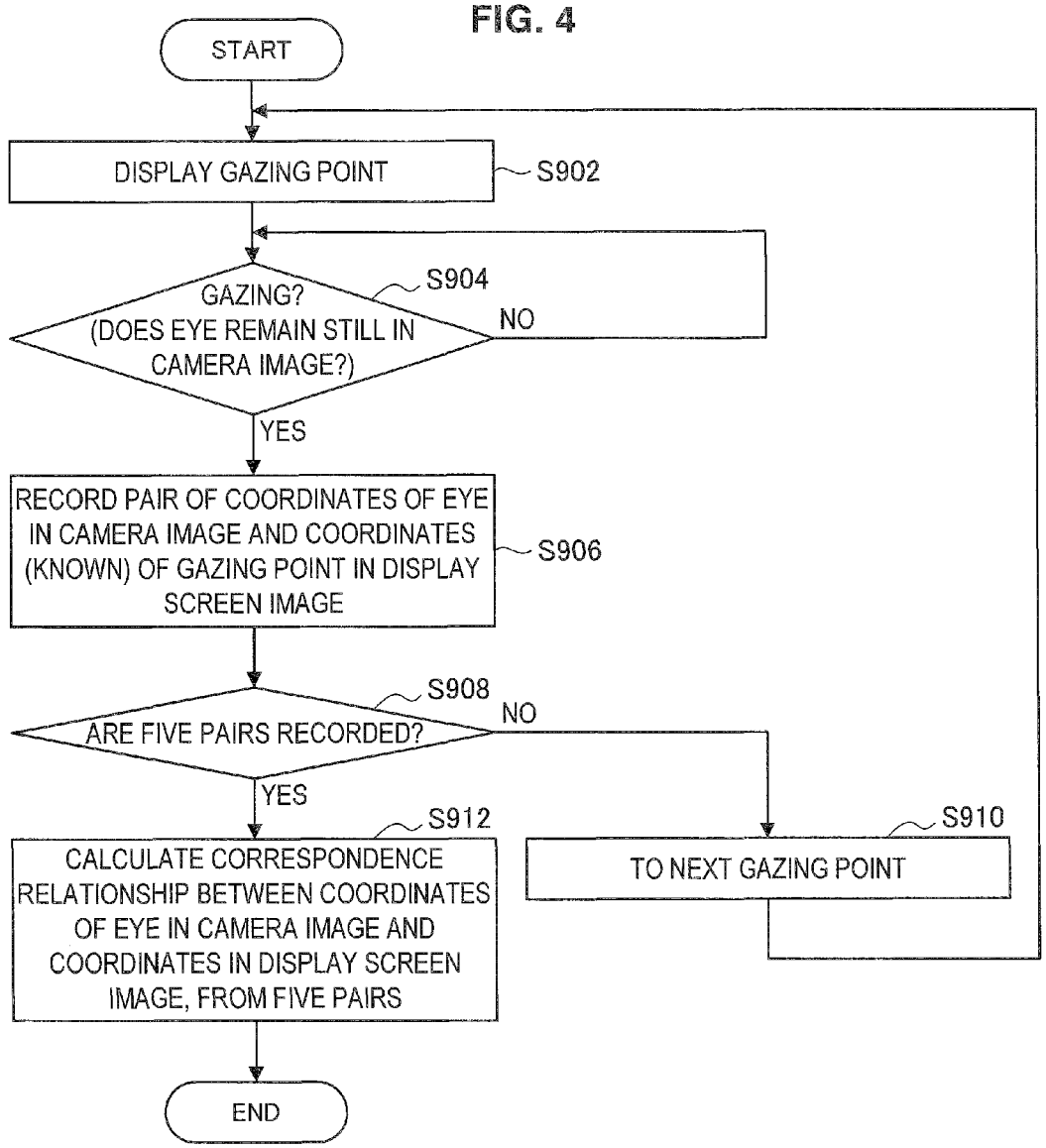
FIG. 4 is a flowchart illustrating a procedure of calibration according to a comparative example.

FIG. 4 is a flowchart illustrating a procedure of the calibration according to the comparative example. The flowchart of FIG. 4 starts from displaying the gazing point (for example, the gazing point P1) illustrated in FIG. 3 (step S902). Next, whether or not the user gazes at the gazing point P1 is determined (step S904). Here, whether the user gazes is decided based on whether or not the eye remains still in the shot image capturing the user by the camera, for example.

If it is determined that the user gazes in step S904 (Yes), the coordinates of the eye in the shot image, and the coordinates of the gazing point P1 in the display unit (which is preset) are paired and recorded (step S906). Then, in order to record the coordinates of the eye relative to all gazing points P1 to P5 (step S908: No), the same processing is executed after proceeding to the next gazing point (step S910).

On the other hand, if the coordinates of the eye relative to each of the gazing points P1 to P5 are recorded (step S908: Yes), the correspondence relationship between the coordinates of the eye in the shot image and the coordinates of the gazing point in the display screen image is calculated (step S912). Then, the error is corrected on the basis of the calculation result.

In the meantime, in the comparative example described above, since the user gazes at each of the five gazing points for one second, the user gazes for at least five seconds. Hence, this is a psychological and temporal burden for the user.

Also, in order to improve the detection accuracy of the sight line, increasing the number of the gazing points, gazing again the gazing point for which the camera has failed to adequately capture the eye of the user, and repeatedly executing the calibration itself are taken as measures. However, when these measures are taken, the time used for the calibration is further prolonged, and the psychological and temporal load given to the user is increased.

In contrast, the information processing apparatus according to an embodiment of the present disclosure described in the following executes the calibration during the normal user interface (UI) operation of the user who is the operator, to reduce the psychological and temporal load given to the user. That is, the calibration is executed in such a manner that the user does not become conscious of the burden.

<2. First Embodiment>
    (2-1. Configuration of Information Processing Apparatus)

Figure 5:
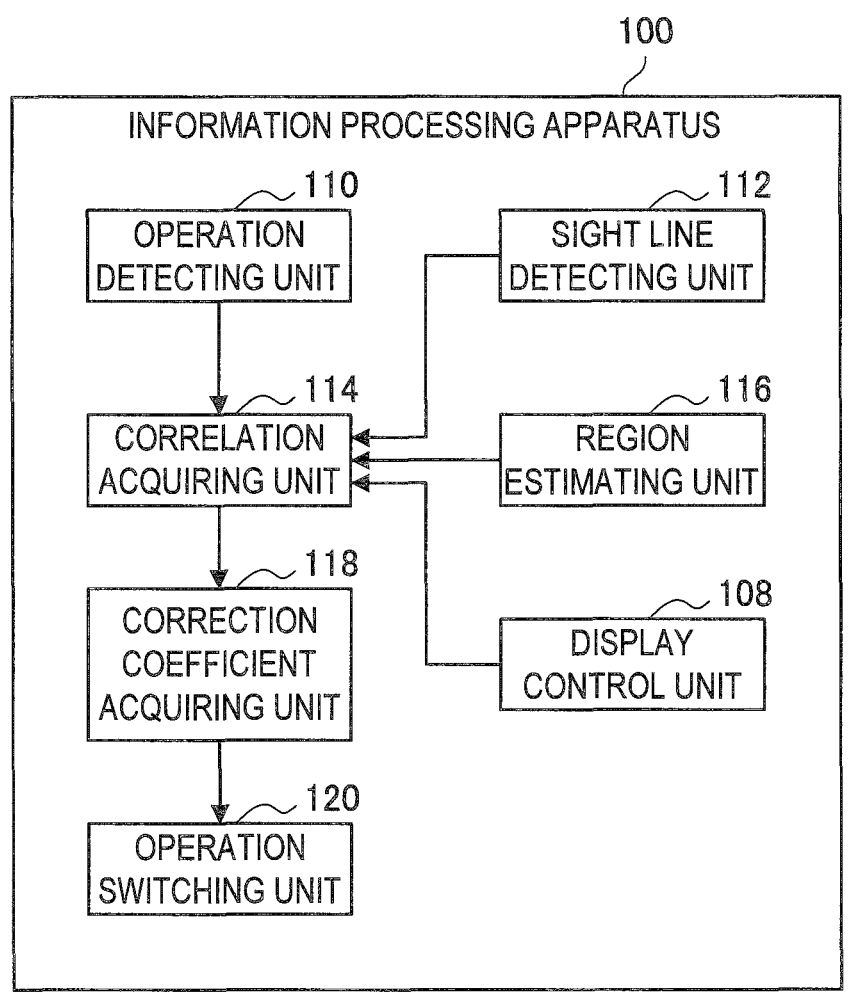
FIG. 5 is a block diagram illustrating an example of a function and configuration of an information processing apparatus according to an embodiment of the present disclosure.

With reference to FIG. 5, description will be made of an example of the configuration of the information processing apparatus according to an embodiment of the present disclosure. FIG. 5 is a block diagram illustrating an example of the function and configuration of the information processing apparatus according to an embodiment of the present disclosure.

In the present embodiment, the information processing apparatus 100 is equipped in the information device such as a notebook personal computer (PC) (here, the information device 10 illustrated in FIG. 1). As illustrated in FIG. 5, the information processing apparatus 100 includes a display control unit 108, an operation detecting unit 110, a sight line detecting unit 112, a correlation acquiring unit 114, a region estimating unit 116, a correction coefficient acquiring unit 118, and an operation switching unit 120.

(Display Control Unit 108)

The display control unit 108 controls the display of the display unit 11 (FIG. 1) of the information device 10. The display unit 11 displays the display screen image for the UI operation, to which the operator such as the user performs the input operation, for example. Note that the display unit 11 is provided integrally with the information device 10, but is not limited thereto. The display unit 11 may be a configuration separated from the information device 10.

Figure 6:
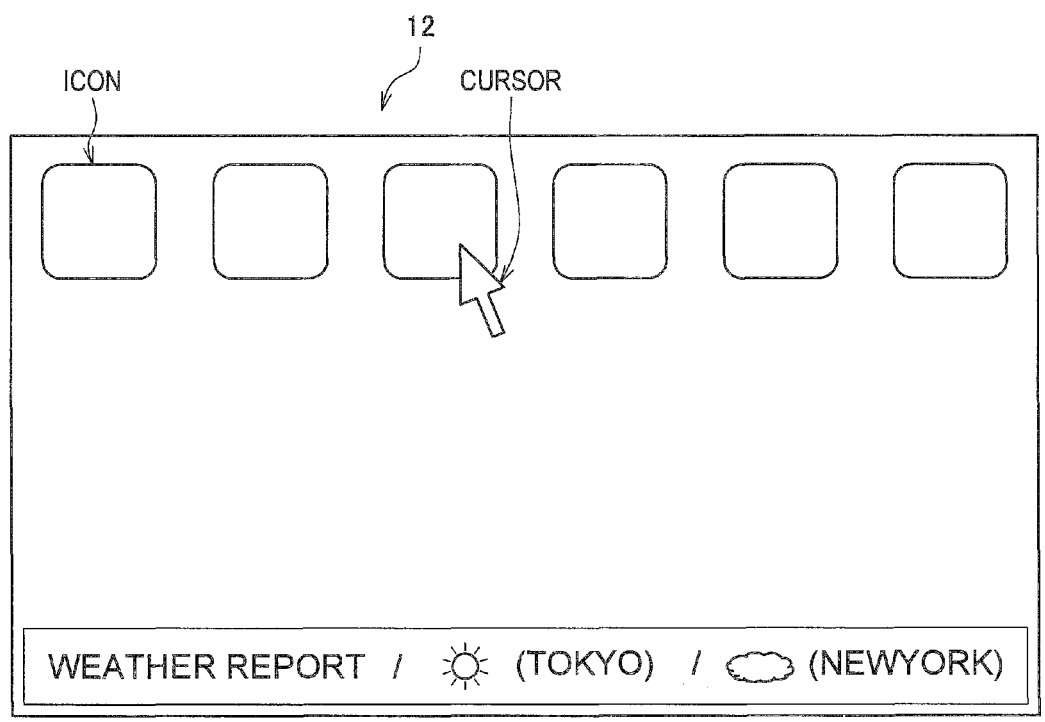
FIG. 6 is a diagram illustrating an example of a display screen image for UI operation, including an operation object.

FIG. 6 is a diagram illustrating an example of the display screen image for the UI operation including operation objects. In the display screen image 12 illustrated in FIG. 6, the cursor and the icon are displayed as the operation objects. Then, the user operates the cursor and the icon (specifically, presses the icon by an input interface (for example, a mouse or a touch pad)), in order to execute the corresponding function (a predetermined input).

Also, the display control unit 108 adds an animation to the operation object that is to be operated by the operator. Here, the added animation expression are, for example, an animation expression by brightness change such as lighting and blinking of the cursor or the icon which are the operation objects, an animation expression by size change of the cursor and the icon, and an animation expression by color change of the cursor and the icon. By adding these animations, the operator can naturally continue looking at the operation object displayed in the display screen image 12. As a result, it becomes easy to acquire the data for calibration.

(Operation Detecting Unit 110)

The operation detecting unit 110 detects the operation of the operator to the display screen image 12. For example, the operation detecting unit 110 detects the operation of the operator to the operation object that is displayed in the display screen image for executing a predetermined input. The operation detecting unit 110 acquires the information from an input interface such as a mouse operated by the operator, in order to detect the operation of the operator to the operation object.

Note that, the operation of the operation object is not limited to the input interface. For example, the operation of the operation object may be a camera gesture, and may be an operation by the sight line.

(Sight Line Detecting Unit 112)

The sight line detecting unit 112 detects the movement of the sight line of the operator on the display screen image. For example, the imaging unit 13 (FIG. 1) equipped in the information device 10 captures an image of the operator, so that the sight line detecting unit 112 detects the movement of the sight line of the operator.

(Correlation Acquiring Unit 114)

The operator normally performs the operation while looking at the cursor or the icon which are the operation objects. That is, the sight line of the operator gazes at the cursor or the icon. Therefore, in the present embodiment when it is determined that the operator continues looking at (following with the eye) the operation object displayed in the display screen image 12, the data for the calibration is employed.

In the present embodiment, in order to determine whether the operator continues looking at the operation object, the correlation between the first transition information (time-series data) indicating the transition of the movement of the operation object, and the second transition information (time-series data) indicating the transition of the movement of the sight line of the operator is checked as described in the following.

The correlation acquiring unit 114 acquires the correlation between the first transition information of the operation object operated by the operator, and the second transition information of the sight line during the operation of the operator. Then, in order to determine the correlation, the correlation acquiring unit 114 combines the first transition information and the second transition information to calculate a cross-correlation function.

Here, description will be made of the cross-correlation function of the two types of time-series data, with reference to FIGS. 7 and 8.

Figure 7:
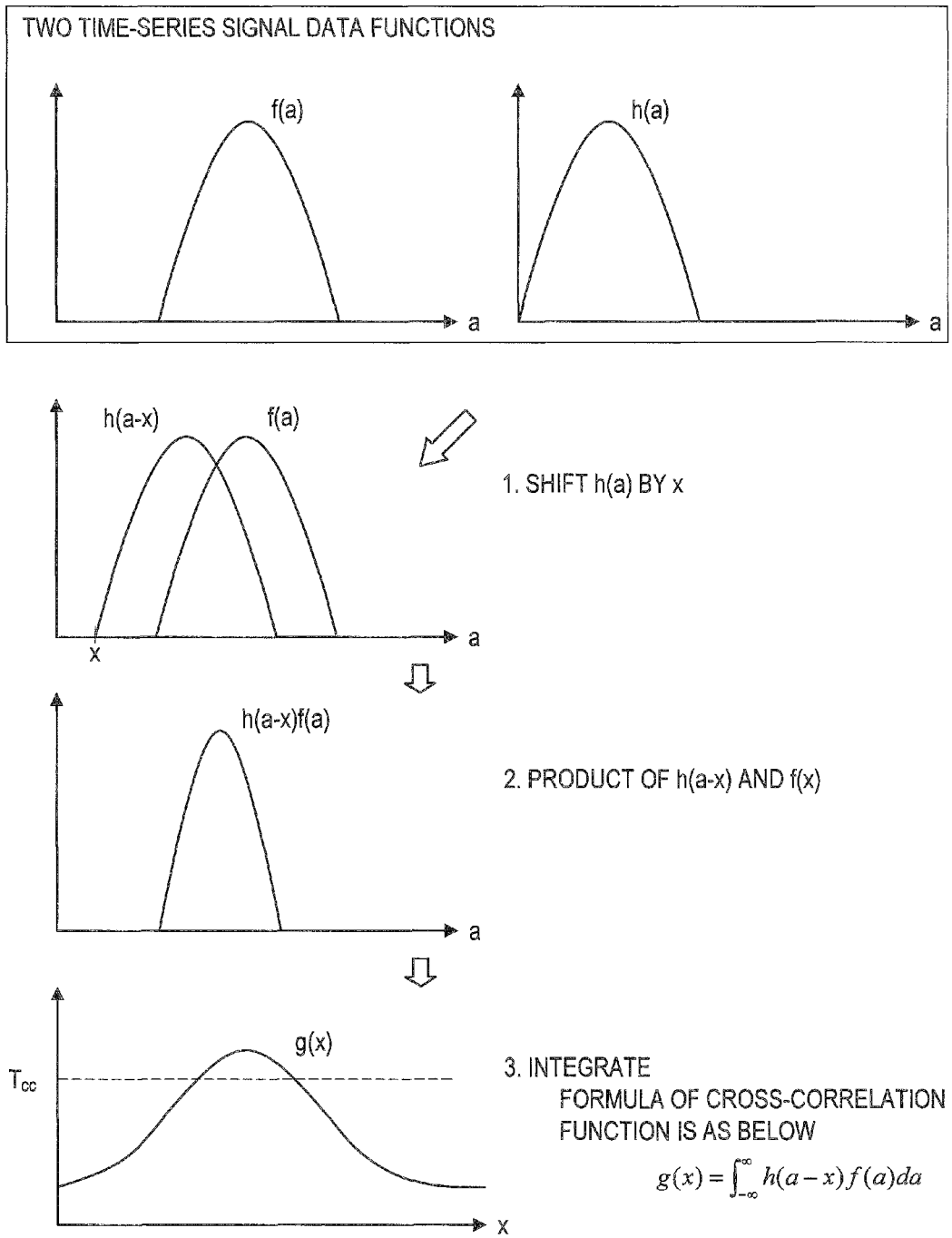
FIG. 7 is a diagram for describing a cross-correlation function when waveforms of two time-series data functions are similar to each other.
Figure 8:
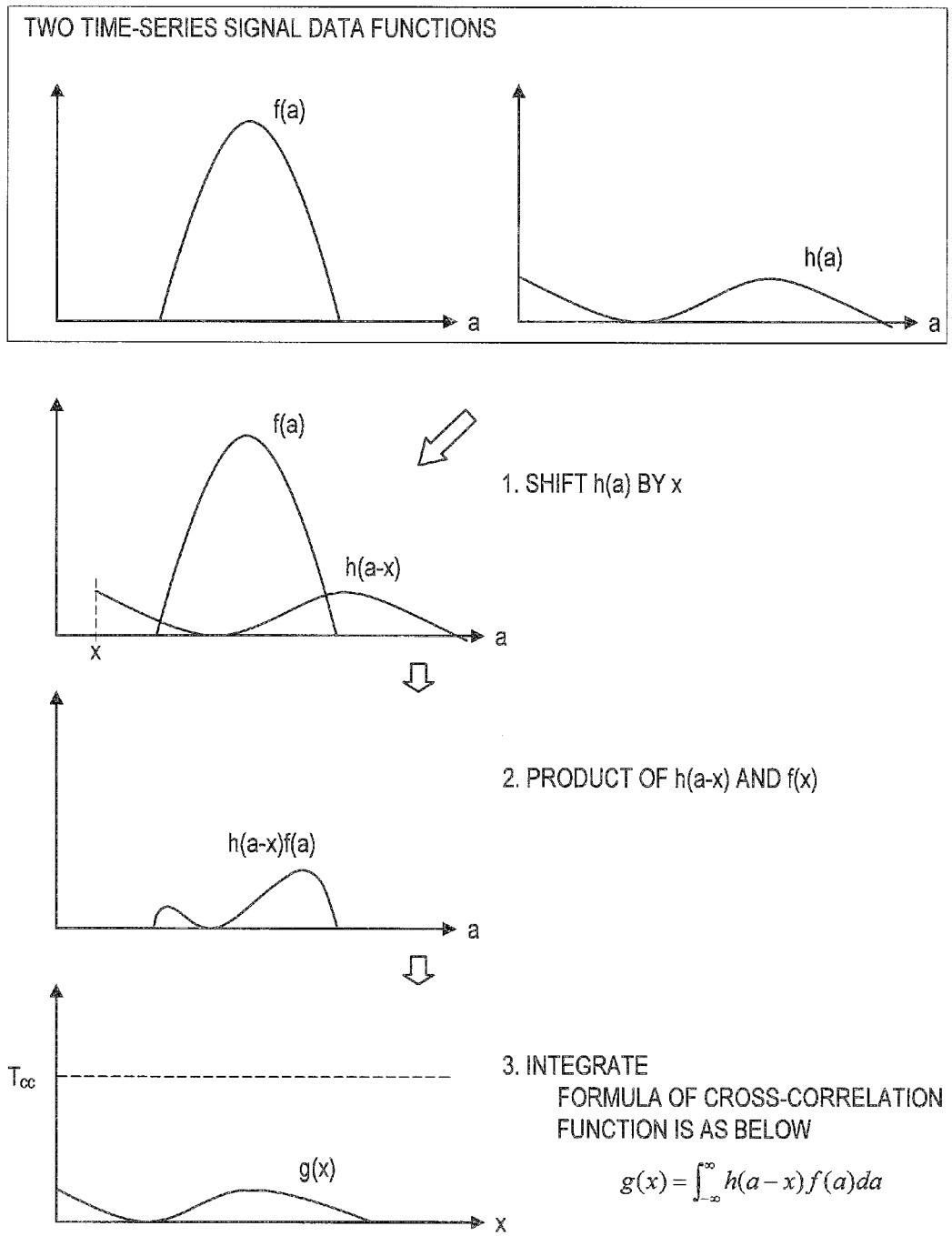
FIG. 8 is a diagram for describing a cross-correlation function when waveforms of two time-series data functions are not similar to each other.

FIG. 7 is a diagram for describing the cross-correlation function when the waveforms of the two time-series data functions are similar to each other. FIG. 8 is a diagram for describing the cross-correlation function when the waveforms of the time-series data functions are not similar to each other. The fact that the waveforms of the two time-series data functions are similar to each other means that the operator follows the operation object with the eye. The fact that the waveforms of the two time-series data functions are not similar to each other means that the operator does not follow the operation object with the eye. Note that, even when the operator follows the operation object with the eye, a difference in phase is generated in the two waveforms of the time-series data.

Description will be made of how to calculate the cross-correlation function according to the present embodiment. Here, two types of time-series data are expressed by the function f(a) and the function h(a), respectively. In FIG. 7, the function f(a) and the function h(a) have a relationship that is different in phase and similar in waveform. On the other hand, in FIG. 8, the function f(a) and the function h(a) have a relationship that is different in phase and not similar in waveform.

First, only one of the two functions is shifted by x. Here, the function h(a) is shifted by x. Next, the product of the function h(a-x) and the function f(x) is calculated. With additional integration, the cross-correlation function g(x) like the below formula is obtained.

$$g(x)=\int_{-\infty}^{\infty}h(a-x)f(a)da$$

The obtained cross-correlation function g(x) has the below feature. That is, when the waveforms of the two time-series data functions are similar to each other, the maximum value of the cross-correlation function g(x) is larger than a predetermined threshold value Tcc as illustrated in FIG. 7. On the other hand, when the waveforms of the two time-series data functions are not similar to each other, the maximum value of the cross-correlation function g(x) is smaller the predetermined threshold value Tcc as illustrated in FIG. 8.

Hence, when the calculated maximum value of the cross-correlation function is equal to or larger than the predetermined threshold value, the correlation acquiring unit 114 determines that the correlation of the first transition information and the second transition information is close. On the other hand, when the calculated maximum value of the cross-correlation function is smaller than the predetermined threshold value, the correlation acquiring unit 114 determines that the correlation of the first transition information and the second transition information is not close. Thereby, the mutual relationship is acquired accurately.

Then, when a certain number or more of data points for the calibration are acquired, the calibration parameter is calculated. Hence, in the present embodiment, while the user operates the operation object displayed in the display screen image, the calibration is executed in the background.

Although in the above the cross-correlation function of the two types of time-series data is calculated, the present disclosure is not limited thereto. For example, the correlation acquiring unit 114 may use a cross-correlation function normalized as the cross-correlation function. In that case, the predetermined threshold value Tcc is set within a range from −1 to 1.

(Region Estimating Unit 116)

The region estimating unit 116 estimates an attention region, to which the operator pays attention, in the display screen image. The region estimating unit 116 outputs the information of the estimated attention region to the correlation acquiring unit 114. Then, the correlation acquiring unit 114 acquires the correlation between the first transition information operated by the operator in the attention region, and the second transition information of the sight line during the operation of the operator. Thereby, only the operation objects within the region to which the user can easily pay attention are estimated among a plurality of the displayed operation objects, and the operation objects within the attention region are subjected to calculation. As a result, the number of the operation objects for which the time-series data of the position are recorded is reduced.

Here, an example of the method to estimate the attention region of the user utilizing a publicly known saliency map will be described.

The saliency map is a map that represents the intensity of saliency corresponding to the input image. Then, the saliency map represents the degrees of "interest of a person" with respect to an image regions, and is calculated by combining image features such as an edge and a color. For example, in the saliency map with respect to the input image capturing a ship floating on the sea, the part of the ship is emphasized (for example, the part of the ship is emphasized by making it white in an solid black image).

Figure 9:
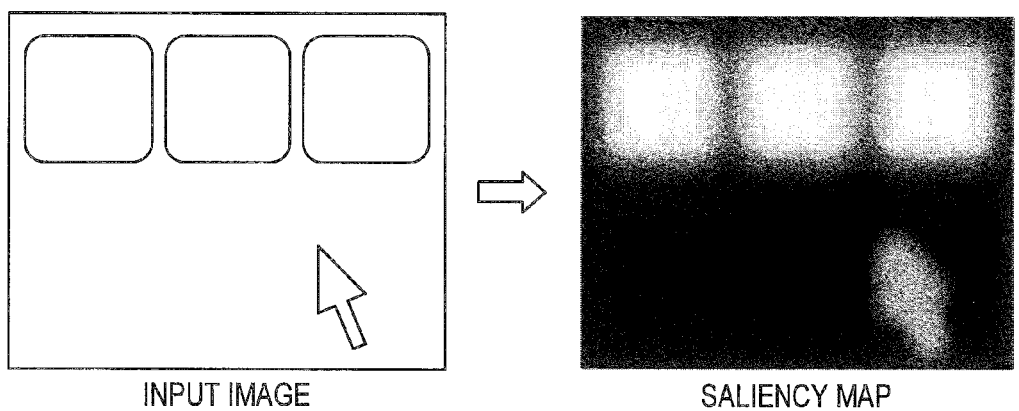
FIG. 9 is a diagram illustrating an example of a saliency map with respect to a display screen image including an operation object.

FIG. 9 is a diagram illustrating an example of the saliency map with respect to a display screen image including operation objects. In FIG. 9, the input image includes three icons and one cursor, which are the operation objects. In that case, the part corresponding to the three icons and one cursor are presented in an emphasized manner in the saliency map. Thereby, the information processing apparatus 100 estimates the parts emphasized in the saliency map as the region to which the user pays attention, and records the time-series data of the position of the operation objects in the estimated attention region. As a result, the time-series data of the position of the operation object of the region to which the user does not pay attention is not recorded.

(Correction Coefficient Acquiring Unit 118)

The correction coefficient acquiring unit 118 acquires the correction coefficient for correcting the error of the sight line input that the operator performs, on the basis of the movement of the sight line detected during the operation of the operator to the operation object. The acquired correction coefficient is the coefficient for correcting the error and for the calibration. Thereby, in the present embodiment, the calibration is executed in the background, while the user operates the operation object displayed in the display screen image.

The correction coefficient acquiring unit 118 acquires the correction coefficient on the basis of the correlation acquired by the correlation acquiring unit 114. That is, the correction coefficient is acquired on the basis of the correlation between the movement of the operation object and the movement of the sight line.

At this, when the correlation between the first transition information of the operation object and the second transition information of the sight line is close, the correction coefficient acquiring unit 118 sets the first transition information and the second transition information, as the data for acquiring the correction coefficient. When the correlation of the first transition information and the second transition information is not close, the correction coefficient acquiring unit 118 does not set the first transition information and the second transition information, as the data for acquiring the correction coefficient. Thereby, only the first transition information and the second transition information between which the correlation is close are utilized as the data for the calibration.

(Operation Switching Unit 120)

The operation switching unit 120 switches the input operation by the operator, depending on the data number of the first transition information and the second transition information effective for acquiring the correction coefficient. That is, the operation switching unit 120 switches the input operation by the operator, depending on the data number for the calibration acquired in the background during the operation of the operation object.

Here, the input operation by the camera gesture and the input operation by the sight line will be described as an example. The operation switching unit 120 switches to the input operation by the gesture when the data number for the calibration is small, and switches to the input operation by the sight line when the data number for the calibration is large.

At this, a graphical user interface (GUI) for informing the user that the input operation is executable by the sight line may be displayed in response to the state of the input operation. Also, the input interface that the user can utilize may be displayed. Thereby, the usability is improved. Note that, when the accuracy of the calibration is high, the gesture and the sight line may be combined, in such a manner that the object to which the input operation is performed by the gesture is selected by the sight line. As a result, the intention of the user is reflected more highly accurately.

Note that, in above, the information processing apparatus 100 is equipped in the notebook PC which is the information device, but is not limited thereto. For example, the information processing apparatus 100 may be equipped in a device such as a smartphone, a tablet, a game machine, a television, and a digital signage.

(2-2. Operation of Information Processing Apparatus)

Figure 10:
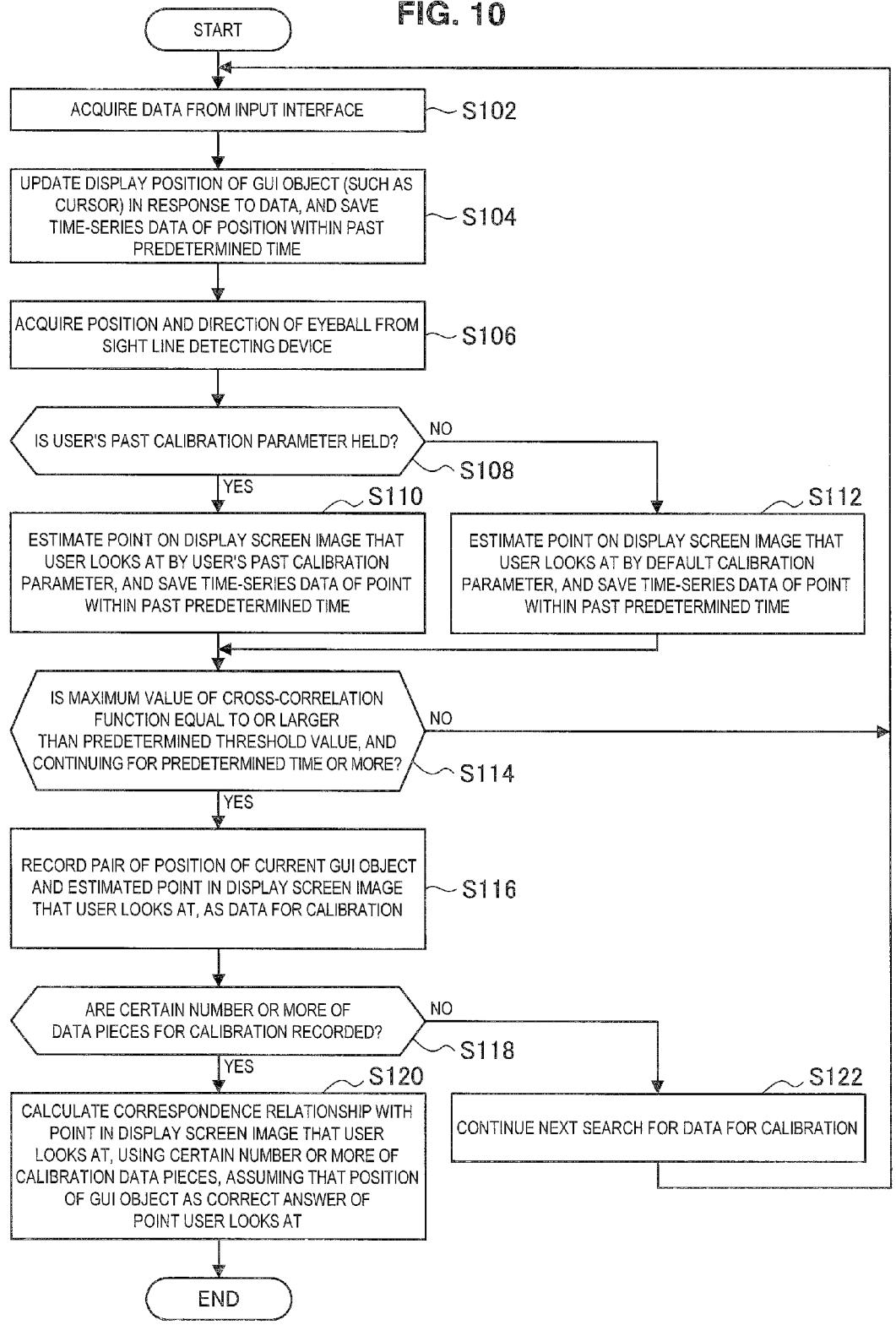
FIG. 10 is a flowchart illustrating an example of an operation of an information processing apparatus according to an embodiment.

With reference to FIG. 10, description will be made of an example of the operation of the information processing apparatus 100 having the configuration described above. FIG. 10 is a flowchart illustrating an example of the operation of the information processing apparatus 100 according to an embodiment of the present disclosure.

The process illustrated in FIG. 10 is realized by the CPU of the information processing apparatus 100 which executes a program stored in the ROM. Note that the executed program may be stored in a recording medium such as a CD (Compact Disk), a DVD (Digital Versatile Disk), a memory card, or may be downloaded from a server or the like via the Internet.

The flowchart of FIG. 10 is started from displaying the display screen image 12 (FIG. 6) for UI operation, including the operation object. The user operates the operation object in the display screen image 12, to execute a desired function by the input interface, for example.

The information processing apparatus 100 first acquires input data corresponding to the user operation from the input interface (step S102). Next, the information processing apparatus 100 updates the display position of the operation object in response to the input data, and saves the time-series data D1 of the position within a predetermined time of the past (step S104).

Next, the information processing apparatus 100 acquires the position and the direction of the eyeball by the sight line detecting unit (step S106). Next, the information processing apparatus 100 determines whether or not the user's calibration parameter of the past is saved (step S108).

If the calibration parameter of the past is saved in step S108 (Yes), the information processing apparatus 100 estimates the point of the display screen image that the user looks at, by the calibration parameter of the past. Then, the information processing apparatus 100 saves the time-series data D2 within a predetermined time of the past at the estimated point (step S110).

On the other hand, if the calibration parameter of the past is not saved in step S108 (No), the information processing apparatus 100 estimates the point of the display screen image that the user looks at by the default calibration parameter. Then, the information processing apparatus 100 saves the time-series data D2 within a predetermined time of the past at the estimated point (step S112).

Next, the information processing apparatus 100 calculates the cross-correlation function (FIG. 7) between the time-series data D1 and the time-series data D2. Then, the information processing apparatus 100 determines whether or not the condition that the calculated maximum value of the cross-correlation function is equal to or larger than the predetermined threshold value and continues to be equal to or larger than the predetermined threshold value for a predetermined time or more is satisfied (step S114).

If the condition that the maximum value of the cross-correlation function is equal to or larger than the a predetermined threshold value and continues to be equal to or larger than the predetermined threshold value for a predetermined time or more is not satisfied in step S114 (No), the information processing apparatus 100 repeatedly executes the process of step S102 to S112 described above.

On the other hand, if the condition that the maximum value of the cross-correlation function is equal to or larger than the a predetermined threshold value and continues to be equal to or larger than the predetermined threshold value for a predetermined time or more is satisfied in step S114 (Yes), the information processing apparatus 100 records the position of the operation object, and the estimated point of the display screen image, as the data for calibration (step S116).

Next, the information processing apparatus 100 determines whether or not a predetermined number or more of data pieces for calibration are recorded (step S118). Then, if the predetermined number or more of the data pieces for calibration are recorded in step S118 (Yes), the information processing apparatus 100 calculates the correspondence relationship with the point in the display screen image that the user looks at, using the data for calibration (step S120).

On the other hand, if a predetermined number or more of the data pieces for calibration are not recorded in step S118 (No), the information processing apparatus 100 continues searching for the data for the next calibration (step S122), and repeats the process described above.

<3. Second Embodiment>

In the meantime, in the calculation of the cross-correlation function described above, when the time-series data of the position of the operation object and the point on the display screen image that the user looks at do not change, the maximum value of the cross-correlation function is high regardless of the position on the display screen image.

Hence, when a plurality of operation objects are displayed in the display screen image, the increased number of the operation objects that is to be calculated makes it difficult to appropriately select the operation object that is to be calculated, which generates a problem that the operation object that the user has actually looked at is not calculated.

Therefore, in order to solve the above problem, in the second embodiment, the information processing apparatus 100 executes the calculation for the operation object having a distance equal to or shorter than a predetermined threshold value from the sight line position of the user, among a plurality of the operation objects, and does not execute the calculation for the operation object having a distance longer than the predetermined threshold value from the sight line position.

Specifically, the correlation acquiring unit 114 (FIG. 5) of the information processing apparatus 100 calculates the distance between the sight line position of the sight line on the display screen image 12 and the gravity center position of the operation object. When the calculated distance is equal to or shorter than the predetermined threshold value, the correlation acquiring unit 114 calculates the cross-correlation function using the first transition information of the operation object. Thereby, the calculation is executed for the operation object having a high possibility that the user actually looks at.

Figure 11:
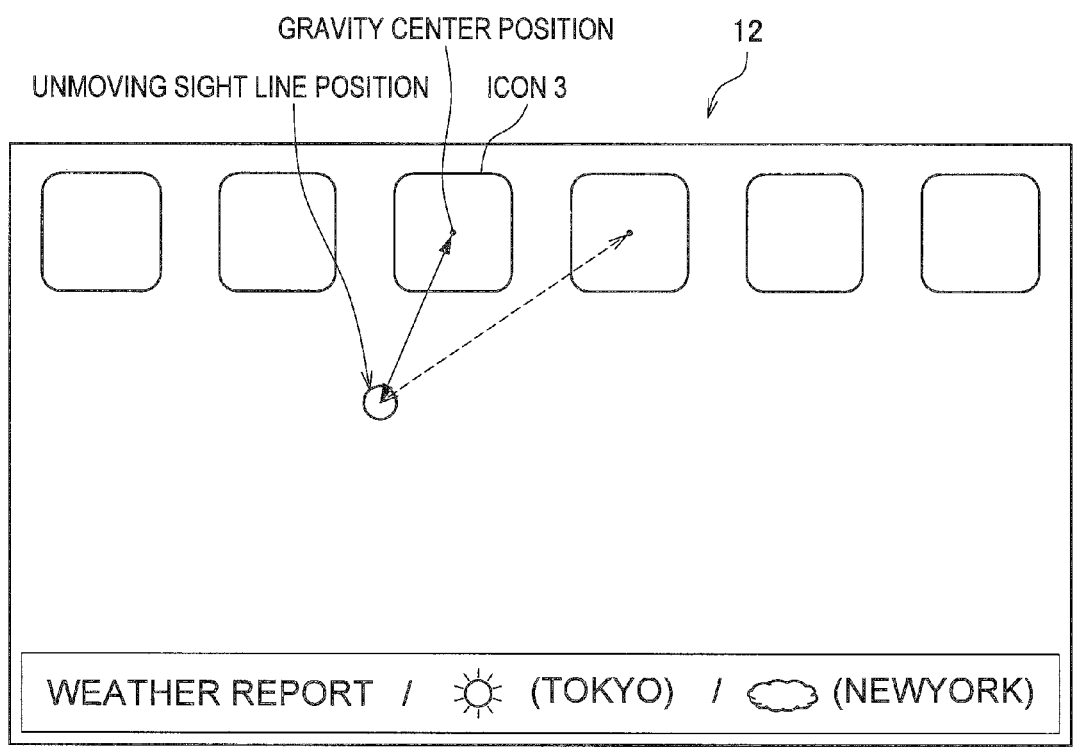
FIG. 11 is a diagram illustrating a distance between a sight line position and a gravity center position of an operation object.

FIG. 11 is a diagram illustrating the distance between the sight line position and the gravity center position of the operation object. In FIG. 11, among a plurality of icons displayed in the display screen image, the calculation is executed for the icon 3 only, which has a distance equal to or shorter than the predetermined threshold value from the unmoving sight line position.

Also, the information processing apparatus 100 does not execute the determination of step S114 of FIG. 10, when the change of the position of the operation object is approximately zero, that is, when the total moving amount of the operation object in the time-series data is equal to or shorter than a certain threshold value. Hence, it is desirable that the determination of whether or not the total moving amount of the operation object is equal to or shorter than the threshold value be executed immediately before step S114 of FIG. 10.

Specifically, the correlation acquiring unit 114 does not calculate the cross-correlation function using the first transition information of the operation object, when the moving amount of the operation object is equal to or shorter than the predetermined threshold value. Thereby, the calculation is not executed to the unmoving operation object whose position does not change.

Although in the above the calibration in the sight line detection has been described, the above may be applied to the calibration in the finger pointing. When the input operation by the sight line and the input operation by the finger pointing are combined to be utilized, it may be determined whether one operation is prioritized in consideration of the accuracies of the both calibrations. Also, in estimating the position pointed by the user on the display screen image, each estimate result may be multiplied by a coefficient according to the calibration accuracy, in order to execute estimation.

<4. Hardware Configuration>

The operation by the information processing apparatus 100 described above is realized by the cooperation of the hardware configuration and the software of the information processing apparatus 100.

Figure 12:
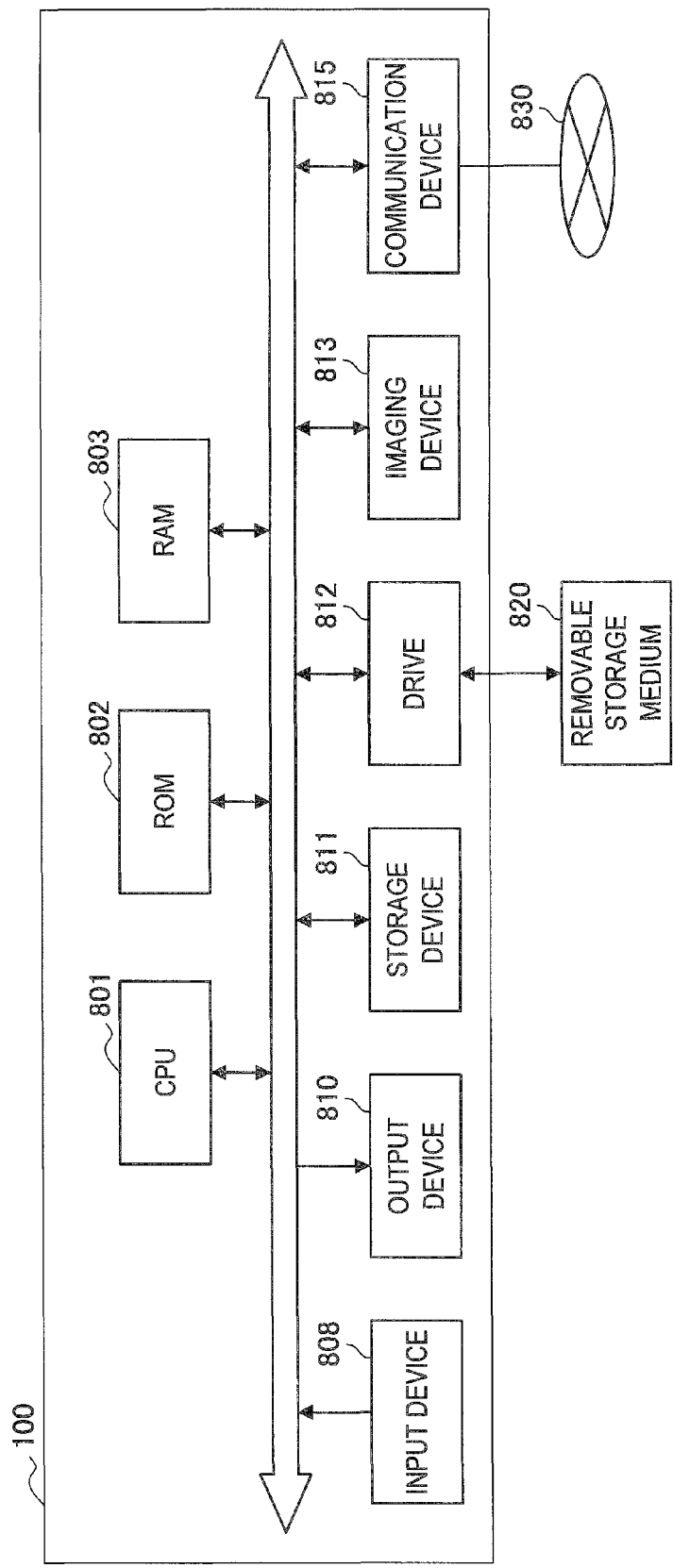
FIG. 12 is an explanatory diagram illustrating an example of a hardware configuration of an information processing apparatus.

FIG. 12 is an explanatory diagram illustrating the exemplary hardware configuration of the information processing apparatus 100. As illustrated in FIG. 12, the information processing apparatus 100 includes a CPU (Central Processing Unit) 801, a ROM (Read Only Memory) 802, a RAM (Random Access Memory) 803, an input device 808, an output device 810, a storage device 811, a drive 812, an imaging device 813, and a communication device 215.

The CPU 801 functions as an operation processor and a control device, and controls the overall operation of the information processing apparatus 100 in accordance with various types of programs. Also, the CPU 801 may be a microprocessor. The ROM 802 stores programs, operation parameters, and other data used by the CPU 801. The RAM 803 temporarily stores the programs used in the execution of the CPU 801, the parameters that change as appropriate in the execution of the programs, and other data. They are connected to each other by a host bus configured from a CPU bus and others.

The input device 808 is composed of a mouse, a keyboard, a touch panel, a button, a microphone, input means for the user to input information such as a switch and a lever, an input control circuit that generates an input signal on the basis of input by the user and outputs the input signal to the CPU 801, and others. The user of the information processing apparatus 100 operates the input device 808, in order to input the various types of data to the information processing apparatus 100 and instruct the processing operation.

The output device 810 includes a display device, such as for example a liquid crystal display (LCD) device, an organic light emitting diode (OLED) device, and a lamp. Further, the output device 810 includes an audio output device such as a speaker and a headphone. For example, the display device displays a captured image, a generated image, and the like. On the other hand, the audio output device converts sound data to sound and outputs the sound.

The storage device 811 is a device for data storage which is configured as one example of the storage unit of the information processing apparatus 100 according to the present embodiment. The storage device 811 may include a storage medium, a recording device that records data on a storage medium, a reading device that reads out data from a storage medium, a deleting device that deletes data recorded on a storage medium, and a like. The storage device 811 stores programs and various types of data executed by the CPU 801.

The drive 812 is a storage medium reader/writer, which is provided either inside or outside the information processing apparatus 100. The drive 812 reads out the information recorded on a removable storage medium 820 such as a magnetic disk, an optical disc, a magneto-optical disk, or a semiconductor memory mounted thereon, and output to the RAM 803. Also, the drive 812 is capable of writing information on the removable storage medium 820.

The imaging device 813 includes an imaging optical system such as a photographing lens and a zoom lens that condenses light and a signal conversion element such as a charge coupled device (CCD) and a complementary metal oxide semiconductor (CMOS). The imaging optical system condenses light emitted from a subject to form an image of the subject on a signal conversion unit. The signal conversion element converts the formed image of the subject into an electric image signal.

The communication device 815 is, for example, a communication interface configured by a communication device for connecting to the network 830 and other devices. Also, the communication device 815 may be a wireless LAN (Local Area Network) compatible communication device, a LTE (Long Term Evolution) compatible communication device, or a wire communication device that communicates via wire.

Note that, the network 830 is a wired or wireless transmission channel of the information transmitted from a device connected to the network 830. For example, the network 830 may include public line networks such as the Internet, a telephone line network, a satellite communication network, various types of local area networks (LAN) including the Ethernet (registered trademark), wide area networks (WAN), and others. Also, the network 830 may include dedicated line networks such as IP-VPN (Internet Protocol-Virtual Private Network).

<5. Conclusion>

The information processing apparatus 100 described above acquires the correction coefficient for correcting the error of the sight line input that the operator performs, on the basis of the movement of the sight line of the operator detected during the operation of the operator to the operation object (a cursor, an icon, etc) displayed in the display screen image 12. That is, the information processing apparatus 100 executes the sight line calibration in the background, during the operation of the normal operation object by the operator. Thereby, the gazing point (FIG. 2) for the sight line calibration is needless to be displayed, the operator is needless to move the sight line in accordance with the display of the gazing point. Accordingly, the calibration for improving the sight line tracking accuracy is executed without making the user conscious of the load.

Figure 13:
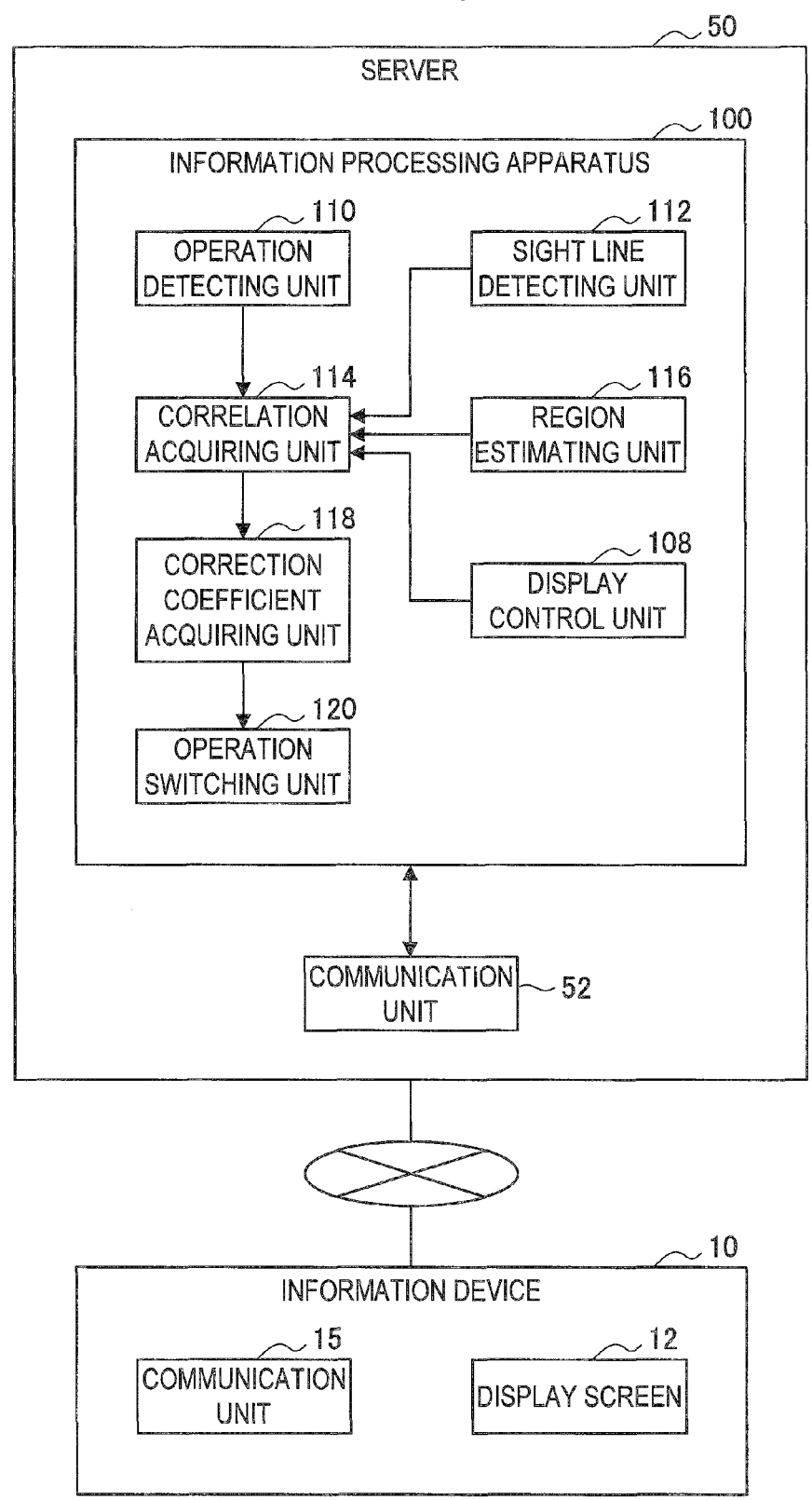
FIG. 13 is a diagram illustrating an example of a function and configuration of an information processing apparatus provided in a server.

Note that, in the above, the information processing apparatus 100 is equipped in the information device 10 having the display screen image 12, but is not limited thereto. As illustrated in FIG. 13, the information processing apparatus 100 may be provided in the server 50 capable of communicating with the information device via a network.

FIG. 13 is a diagram illustrating an example of the function and configuration of the information processing apparatus provided in the server. The server 50 illustrated in FIG. 13 includes an information processing apparatus 100 in the same way as the configuration described in FIG. 5, and a communication unit 52 capable of communicating with the information device 10. When the operator operates the operation object displayed in the display screen image 12 of the information device 10, the transition information of the movement of the operation object, and the transition information of the movement of the sight line of the operator are transmitted to the server 50 via the communication unit 15. Thereby, the server 50 acquires the correction coefficient for correcting the error of the sight line input that the operator performs.

It should be understood by those skilled in the art that various modifications, combinations, sub-combinations and alterations may occur depending on design requirements and other factors insofar as they are within the scope of the appended claims or the equivalents thereof.

The steps illustrated in the flowcharts in the above-described embodiment naturally include processes performed in the described and chronological order, and further include processes that are not necessarily performed in chronological order, but are also performed in parallel or are individually performed. It is also possible to change the order as necessary even in the steps for chronologically performing the processes.

A process performed by the information processing apparatus described in the present specification may be realized by using any one of software, hardware, and a combination of software and hardware. A program included in software is stored in advance in, for example, a storage medium that is built in or externally provided to each apparatus. When executed, programs are each read out by, for example, Random Access Memory (RAM), and executed by a processor such as a CPU.

Additionally, the present technology may also be configured as below:

(1) An information processing apparatus including:
an operation detecting unit configured to detect an operation of an operator to an object that is displayed in a display screen image for performing a predetermined input;
a sight line detecting unit configured to detect a movement of a sight line of the operator on the display screen image; and
a correction coefficient acquiring unit configured to acquire a correction coefficient for correcting an error of a case where the operator performs sight line input, on the basis of the movement of the sight line detected during the operation of the operator to the object.

(2) The information processing apparatus according to (1), further including
a correlation acquiring unit configured to acquire a correlation between first transition information of the object operated by the operator and second transition information of the sight line during the operation of the operator,
wherein the correction coefficient acquiring unit acquires the correction coefficient on the basis of the acquired correlation.

(3) The information processing apparatus according to (2), wherein
the correction coefficient acquiring unit
sets the first transition information and the second transition information, as data for acquiring the correction coefficient, when the correlation between the first transition information of the object and the second transition information of the sight line is close, and
does not set the first transition information and the second transition information, as data for acquiring the correction coefficient, when the correlation between the first transition information and the second transition information is not close.

(4) The information processing apparatus according to (3), wherein
the correlation acquiring unit
combines the first transition information and the second transition information to calculate a cross-correlation function,
determines that the correlation between the first transition information and the second transition information is close, when a maximum value of the calculated cross-correlation function is equal to or larger than a predetermined threshold value, and
determines that the correlation between the first transition information and the second transition information is not close, when the maximum value of the cross-correlation function is smaller than the predetermined threshold value.

(5) The information processing apparatus according to (4), wherein
the correlation acquiring unit uses a normalized cross-correlation function as the cross-correlation function.

(6) The information processing apparatus according to (4) or (5), wherein
the correlation acquiring unit
calculates a distance between a sight line position of the sight line on the display screen image and a gravity center position of the object, and
calculates the cross-correlation function using the first transition information of the object, when the distance is equal to or shorter than the predetermined threshold value.

(7) The information processing apparatus according to (4) or (5), wherein
the correlation acquiring unit does not calculate the cross-correlation function using the first transition information of the object, when a moving amount of the object is equal to or shorter than a predetermined threshold value.

(8) The information processing apparatus according to any one of (1) to (7), further including
a display control unit configured to add an animation to the object that is to be operated by the operator.

(9) The information processing apparatus according to any one of (2) to (7), further including
a region estimating unit configured to estimate a region to which the operator pays attention in the display screen image,
wherein the correlation acquiring unit acquires a correlation between the first transition information of the object operated by the operator in the estimated region and the second transition information of the sight line during the operation of the operator.

(10) The information processing apparatus according to any one of (3) to (7), further including
an operation switching unit configured to switch an input operation by the operator, depending on data numbers of the first transition information and the second transition information that are effective for acquiring the correction coefficient.

(11) An information processing method including:
detecting an operation of an operator to an object that is displayed in a display screen image for performing a predetermined input;
detecting a movement of a sight line of the operator on the display screen image; and
acquiring a correction coefficient for correcting an error of a case where the operator performs sight line input, on the basis of the movement of the sight line detected during the operation of the operator to the object.

(12) A program for causing a computer to execute:
detecting an operation of an operator to an object that is displayed in a display screen image for performing a predetermined input;
detecting a movement of a sight line of the operator on the display screen image; and
acquiring a correction coefficient for correcting an error of a case where the operator performs sight line input, on the basis of the movement of the sight line detected during the operation of the operator to the object.

What is claimed is:
1. An information processing apparatus, comprising:
a central processing unit (CPU) configured to:
detect an operation of a user to an object that is displayed in a display screen image;
detect a movement of a sight line of the user on the display screen image;
acquire a correction coefficient to correct an error when the user performs sight line input, based on the movement of the sight line detected during the operation of the user to the object;
acquire a correlation between first transition information of the object operated by the user and second transition information of the sight line detected during the operation of the user to the object; and
set the first transition information and the second transition information, as data to acquire the correc- tion coefficient, based on the correlation that is smaller than a first threshold value.

2. The information processing apparatus according to claim 1, wherein the CPU is further configured to:
acquire the correction coefficient based on the acquired correlation.

3. The information processing apparatus according to claim 2, wherein the CPU is further configured to:
estimate a region to which the user pays attention in the display screen image, and
acquire the correlation between the first transition information of the object operated by the user in the estimated region and the second transition information of the sight line detected during the operation of the user to the object.

4. The information processing apparatus according to claim 1, wherein the CPU is further configured to:
combine the first transition information and the second transition information to calculate a cross-correlation function,
determine that the correlation between the first transition information and the second transition information is smaller than the first threshold value, based on a maximum value of the calculated cross-correlation function that is equal to or larger than a second threshold value.

5. The information processing apparatus according to claim 4, wherein a normalized cross-correlation function is used as the cross-correlation function.

6. The information processing apparatus according to claim 4, wherein the CPU is further configured to:
calculate a distance between a sight line position of the sight line on the display screen image and a gravity center position of the object, and
calculate the cross-correlation function using the first transition information of the object, based on the distance that is equal to or shorter than a third threshold value.

7. The information processing apparatus according to claim 4, wherein the CPU is further configured to calculate the cross-correlation function using the first transition information of the object, based on a moving amount, of the object, that is equal to or shorter than a third threshold value.

8. The information processing apparatus according to claim 1, wherein the CPU is further configured to add an animation to the object operated by the user.

9. The information processing apparatus according to claim 3, wherein the CPU is further configured to:
switch an input operation by the user, based on the first transition information and the second transition information that are effective to acquire the correction coefficient.

10. An information processing method, comprising:
detecting an operation of a user to an object that is displayed in a display screen image;
detecting a movement of a sight line of the user on the display screen image;
acquiring a correction coefficient for correcting an error when the user performs sight line input, based on the movement of the sight line detected during the operation of the user to the object;
acquiring a correlation between first transition information of the object operated by the user and second transition information of the sight line detected during the operation of the user to the object; and
setting the first transition information and the second transition information, as data for acquiring the correction coefficient, based on the correlation that is smaller than a first threshold value.

11. A non-transitory computer-readable storage medium having stored thereon a set of computer-executable instructions that, when executed by a processor, cause a computer to perform operations, the operations comprising:
detecting an operation of a user to an object that is displayed in a display screen image;
detecting a movement of a sight line of the user on the display screen image;
acquiring a correction coefficient for correcting an error when the user performs sight line input, based on the movement of the sight line detected during the operation of the user to the object;
acquiring a correlation between first transition information of the object operated by the user and second transition information of the sight line detected during the operation of the user to the object; and
setting the first transition information and the second transition information, as data for acquiring the correction coefficient, based on the correlation that is smaller than a first threshold value.

* * * * *